(12) United States Patent
Lucand et al.

(10) Patent No.: US 6,557,336 B2
(45) Date of Patent: May 6, 2003

(54) ADJUSTABLE HARVEST MATERIAL TRANSPORT ASSEMBLY FOR MOVING THE MATERIAL FROM A PICK-UP TO A PROCESSOR INLET

(75) Inventors: Philippe Lucand, Melin (FR); Jean Viaud, Gray (FR); Etienne Josset, Gray (FR)

(73) Assignee: Deere & Company, Moline, IL (US)

( * ) Notice: Subject to any disclaimer, the term of this patent is extended or adjusted under 35 U.S.C. 154(b) by 4 days.

(21) Appl. No.: 09/854,401

(22) Filed: May 11, 2001

(65) Prior Publication Data

US 2002/0011061 A1 Jan. 31, 2002

(30) Foreign Application Priority Data

May 12, 2000 (DE) .......................................... 100 23 443

(51) Int. Cl.[7] .............................................. A01D 39/00
(52) U.S. Cl. .......................................... 56/341; 56/364
(58) Field of Search ................... 56/341, 364; 100/88, 100/89; A01F 15/10; A01D 89/00

(56) References Cited

U.S. PATENT DOCUMENTS 4,436,027 A * 3/1984 Freimuth et al. ............. 100/88

FOREIGN PATENT DOCUMENTS

| DE | 41 02 034 | 7/1992 |
|---|---|---|
| DE | 42 01 545 | 7/1993 |
| DE | 42 19 719 | 7/1993 |
| DE | 195 46 263 | 8/1999 |
| DE | 198 21 591 | 11/1999 |
| DE | 198 41 598 | 3/2000 |
| EP | 0 074 533 | 3/1983 |
| EP | 0 339 733 | 11/1989 |
| EP | 0 815 720 | 1/1998 |

* cited by examiner

*Primary Examiner*—Thomas B. Will
*Assistant Examiner*—Meredith C. Petravick

(57) ABSTRACT

A large round baler includes a pick-up which delivers crop to a transport assembly including a guide wall and tined rotor, together with a rotor stripper, which cooperate to move harvest material from the pick-up to the inlet of a baling chamber. Various embodiments are disclosed for moving one or more of the guide wall, rotor or stripper for effecting adjustments narrowing or expanding the cross section of a guide channel for the harvest material defined in part by the guide wall, rotor and stripper. These adjustments can be done manually or with power and can be made in response to computer generated information or command signals resulting from collected and/or stored data indicating various conditions of the harvested material.

18 Claims, 7 Drawing Sheets

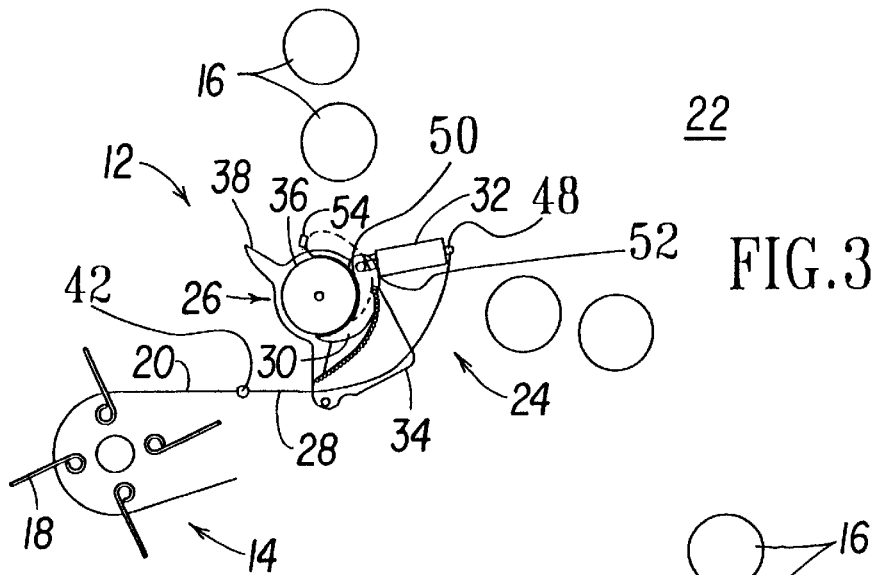
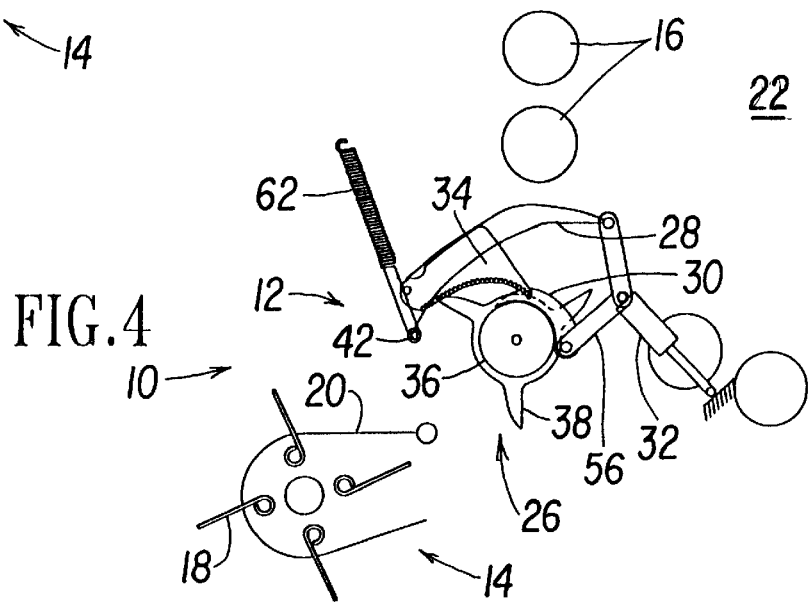
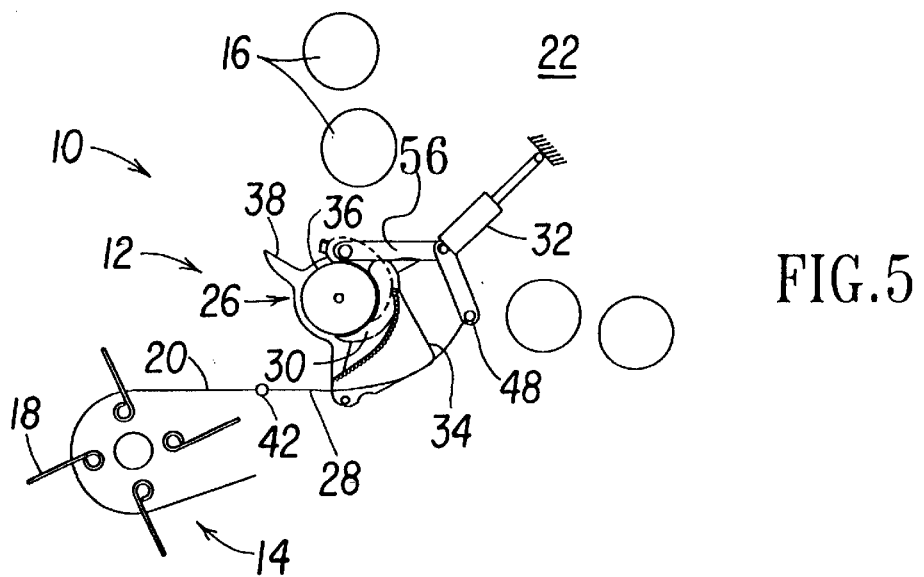

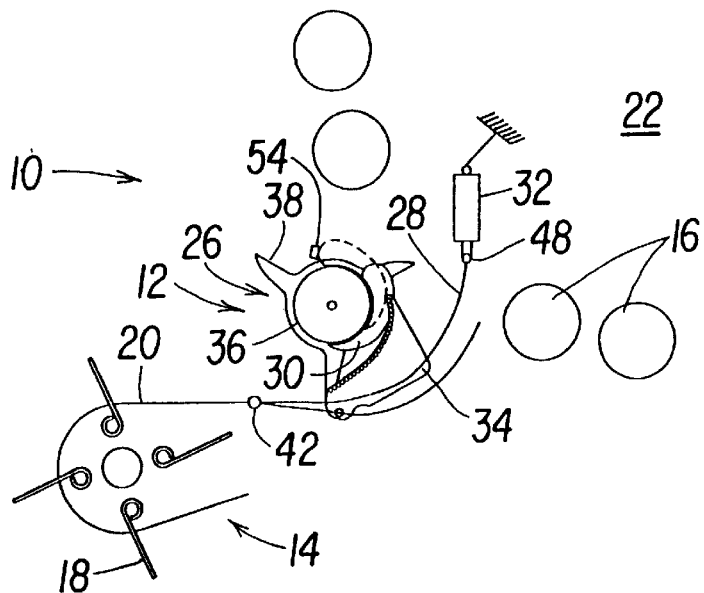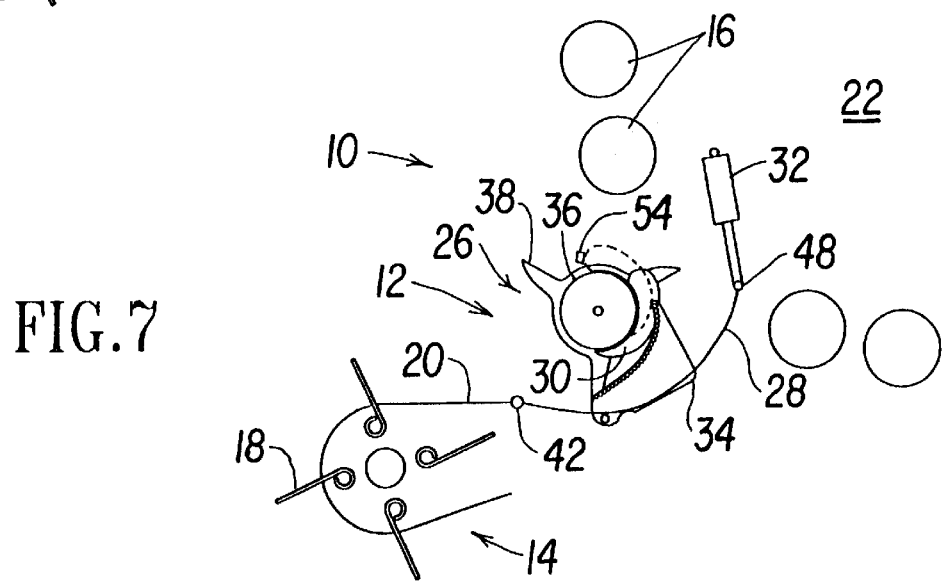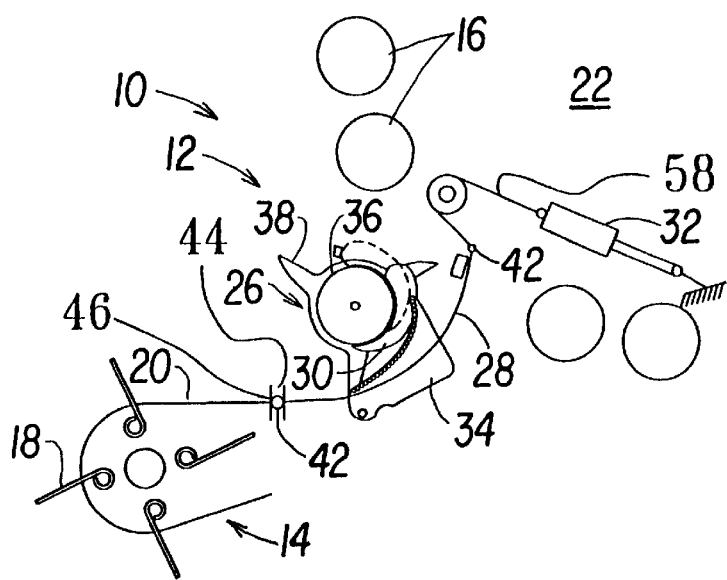

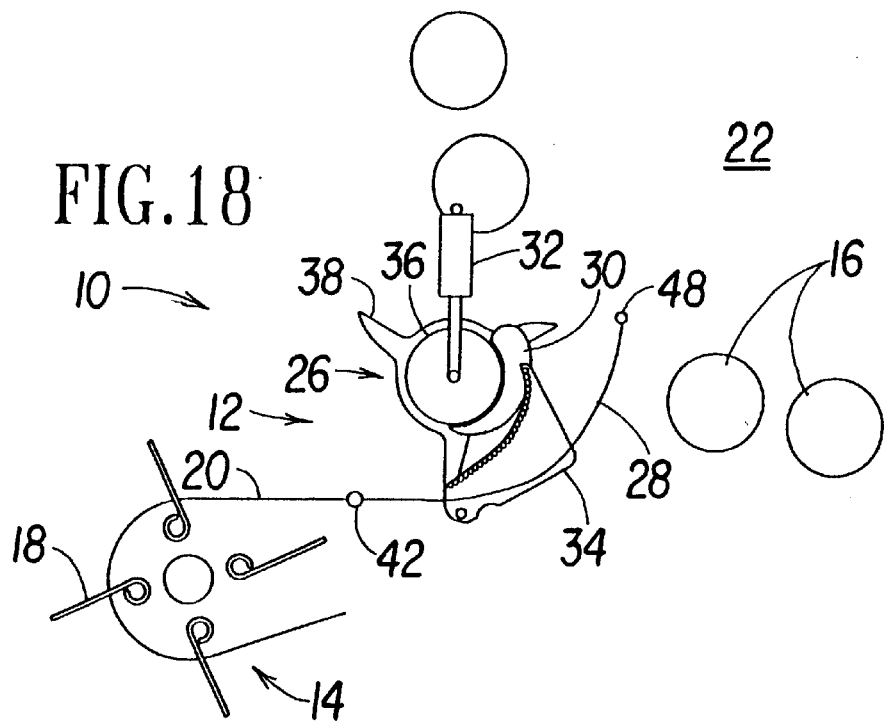
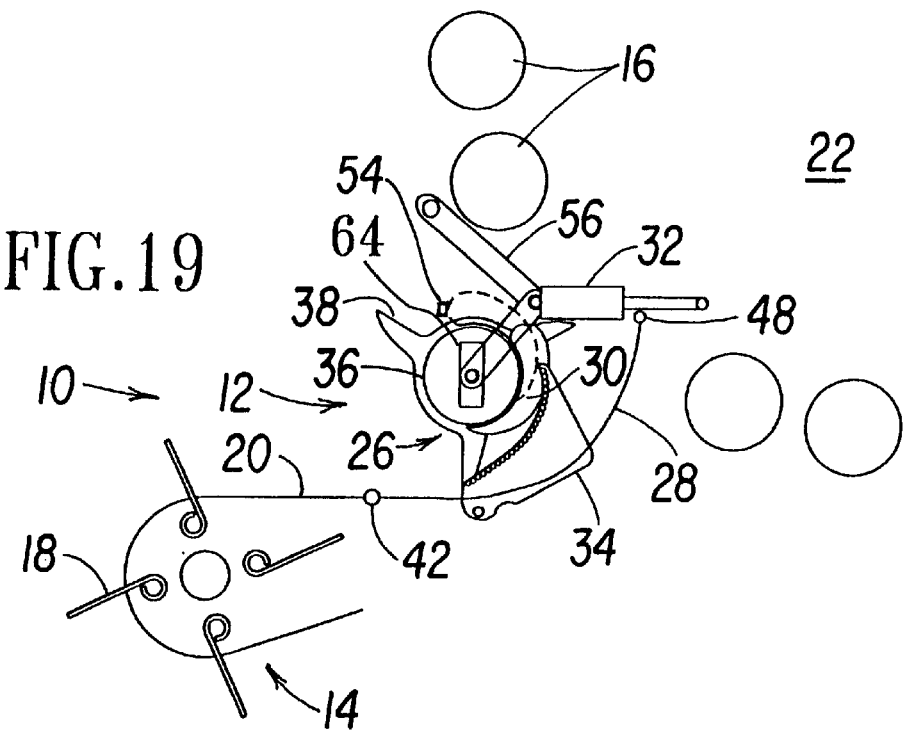

ADJUSTABLE HARVEST MATERIAL TRANSPORT ASSEMBLY FOR MOVING THE MATERIAL FROM A PICK-UP TO A PROCESSOR INLET

FIELD OF THE INVENTION

The present invention pertains to a transport or conveying assembly for a harvest recovery machine, the assembly including a rotor, at least one stripper and a crop transport channel that includes at least one guide wall.

BACKGROUND OF THE INVENTION

DE-C1 42 19 719 discloses a baling press for large bales which includes a transport channel through which the harvested crop material is conveyed from a pick-up to a compression channel by a stuffing rotor. The transport channel includes a guide wall that is formed of webs that extend in the material flow direction and guide plates situated between these webs. The guide plates are able to move against the force of springs in order to prevent peak loads.

DE-C2 195 46 263 discloses a transport device for a round baler, in which the transport channel includes a lower guide wall that can be pivoted transverse to the material flow direction about a downstream bearing. A movement of the guide wall and consequently a widening of the inlet gap occurs when a certain pressure of the harvest material is reached.

According to DE-C1 198 21 591, the bottom of a transport section between a pick-up and the compression chamber of a baler is held in a pivot bearing on its upstream end and adjustable at a downstream end region, namely transverse to the material flow. The adjustment is realized with the aid of a motor and serves for removing obstructions from the transport channel.

According to EP-A1 0 074 533 a guide wall of a transport device of a self-loading forage box can be adjusted with the aid of a lever in order to remove obstructions.

EP-A1 0 339 733 discloses a pivoted wall that makes it possible to open the transport channel in order to make it possible to remove obstructions from the supply channel of a large agricultural baler.

According to DE-A1 198 41 598, a round baler is provided with a cutting mechanism in combination with a rotor. Knives that protrude through a wall and extend into a transport channel are provided opposite the rotor. The wall can be adjusted transverse to the material flow upstream of the rotor in order to change the channel cross section. On the downstream end, the wall can be pivoted downward in order to remove foreign matter from the channel. The harvest material is removed from the rotor at the harvest material inlet by a stationary stripper. The adjustment of the wall takes place in dependence on a torque that is measured on the rotor.

The problem on which the invention is based can be seen in the fact that known measures aim to remove or eliminate rather than prevent obstructions or peak loads or require a significant adjustment of the guide wall.

SUMMARY OF THE INVENTION

According to the present invention there is provided an improved arrangement of adjustable components for transporting harvest material from a pickup into a baling chamber.

An object of the invention is to provide components arranged for defining a channel through which harvest material is transported and for effecting the transport of such material from a pick-up to the inlet of an arrangement for further processing, with at least some of the components being adjustable to vary the cross section of the channel in accordance with the amount of crop so as to maintain a constant density.

A more specific object of the invention is to provide transport components, as set forth in the previous object, wherein one of the components is a guide wall which is adjustable transversely to the flow path of the material as it progresses from the pick-up to the inlet.

Another object of the invention is to provide transport components, as set forth in one or more of the previous objects, wherein a tined rotor is provided for acting in conjunction with the guide wall to form a portion of the channel, with the tined rotor being adjustable alone or together with the guide wall in a direction transverse to the flow path of the material as it progresses from the pick-up to the inlet.

Still another object of the invention is to provide transport components, as set forth in one or more of the previous objects, wherein a stripper assembly is associated with the tined rotor and acting in conjunction with the guide wall to form a portion of the channel, with the stripper assembly being adjustable alone or together with the guide wall and/or the rotor in a direction transverse to the flow path of the material as it progresses from the pick-up to the inlet.

These and other objects will become apparent from a reading of the ensuing description together with the appended drawings.

BRIEF DESCRIPTION OF THE DRAWINGS

FIGS. 1 through 6 and 8 through 19 are schematic left side views of a forward portion of a large round baler, with each figure showing a respective one of eighteen different embodiments of the transport device.

FIG. 7 illustrates a different position of the transport device shown in FIG. 6.

DESCRIPTION OF THE PREFERRED EMBODIMENT

Figure 1:
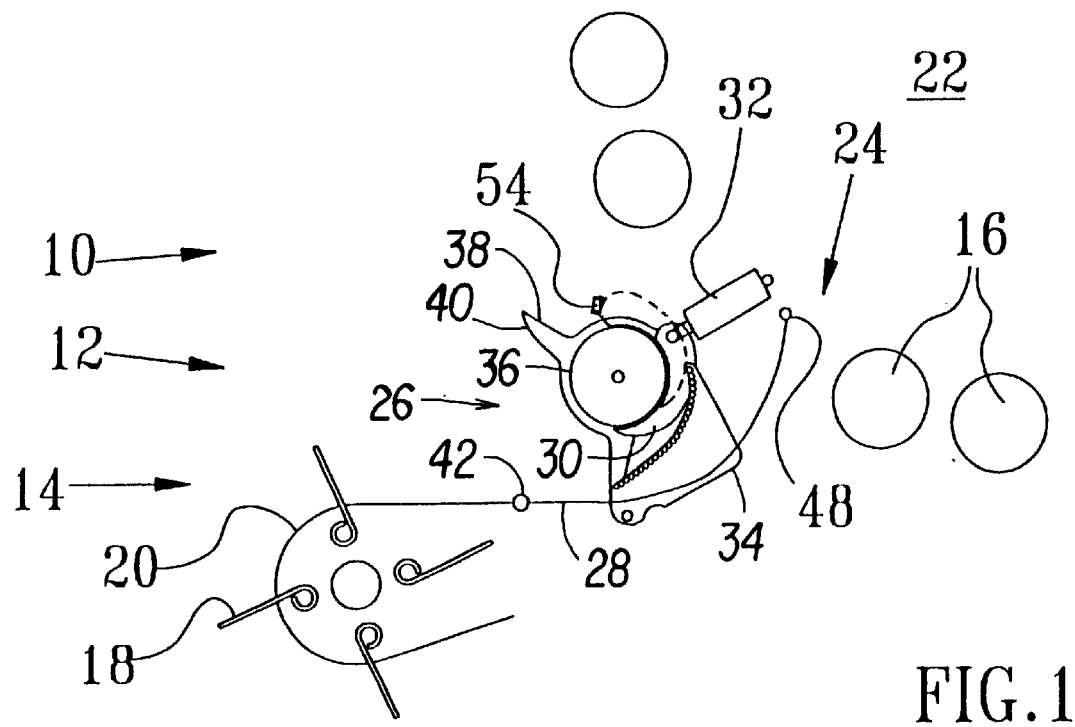

Referring now to FIG. 1, there is shown a harvest recovery machine 10 that is equipped with a crop transport device 12 constructed in accordance with the principles of the present invention. The machine 10 is here shown in the form of a baler for making large cylindrical bales and having a bale compression chamber of fixed size. However, it is to be understood that the present invention could just as well be applied to a baler having a bale compression chamber that is variable in size, a baler for making parallelepiped bales, a self-loading forage box, or the like. In addition to the transport device 12, the harvest recovery machine 10 includes, among other things, a pick-up 14 and compression elements 16.

The pick-up 14 lifts the harvest material off the ground by means of revolving teeth or prongs 18 and transports the harvest material toward the compression elements 16 by stripper plates 20.

The compression elements 16 are illustrated in the form of rollers, but may also be realized differently, namely, in the form of belts or rod chains that extend over rollers. The compression elements 16 are arranged on an arc of a circle together with other not-shown compression elements 16 and surround a compression or baling chamber 22, in which the supplied harvest material is compressed into a bale. At the lower front of the baling chamber 22, two of the compression elements 16 are separated so as to define an inlet 24, here shown at approximately the 7:00 position, however its position could be varied to a certain degree. The transport device 12 protrudes into the inlet 24.

The compression elements 16, the pick-up 14 and the transport device 12 are arranged on a not-shown undercarriage that is supported on the ground by wheels and can be connected to a towing vehicle by a not-shown hitch. In this respect, no detailed explanations are provided because this aspect does not pertain to the invention.

In all embodiments, the essential components of the transport device 12 consist of a rotor 26, a guide wall 28, strippers 30 and an adjusting device 32. Knives 34 are provided as secondary but not absolutely imperative components.

The rotor 26 is driven in a fashion that is not illustrated in the figures, namely in such a way that it moves the harvest material from the pick-up 14 to the inlet 24. Depending on its arrangement, the rotating direction may either be clockwise or counterclockwise. The rotor 26 includes a central core in the form of a tube 36 to which is secured feeder tines 38. The tines 38 extend approximately radially from the tube 36 and are preferably attached thereto by screws or welding. The tines 38 are arranged in co-planar sets of three which may be formed from the same plate. Five or six of these sets of tines 36 may be spaced axially along the length of the tube 36. The tines 38 each have a leading, curved transport edge 40 and a straight trailing edge which converge radially outward to form a point, the length of the tines 38 being such that they extend into the vicinity of the guide wall 28. The number of teeth 38 and their distribution can be adapted to the respective circumstances.

The guide wall 28 is formed by a stiff plate of steel bent to form a trough facing the rotor 26 and has sufficient stability to withstand the pressure of the material being transported and guides this material on a partially concentric path around the rotor 26. The guide wall 28 may be reinforced by means of webs or ribs or the like in a fashion that is not illustrated in the figures. In the embodiments shown, the guide wall 28 is provided with not-shown slots through which the knives 34 are able to extend such that they are not influenced by the position of the guide wall 28. Although the function of the guide wall 28 is identical in all embodiments and the curvature and length of the guide walls 28 are essentially also identical, the suspension of the guide wall 28 on the upstream and the downstream end region is realized differently.

In the embodiments according to FIGS. 1–3, 5–7, 9, 15, 18 and 19, the upstream end of the guide wall 28 is held in a stationary pivot bearing 42. Due to this measure, the guide wall 28 can be pivoted about this pivot bearing 42 transverse to the material flow direction, as described in greater detail below. The pivot bearing 42 is positioned such that a transition without shoulders is formed between the plates 20 and the guide wall 28, if the rotor 26 is rotating counterclockwise, as viewed in FIG. 1, so as to function as an undershot rotor. If the rotor 26 is rotated clockwise, as viewed in FIG. 2, so as to function as an overshot rotor, the pivot bearing 42 is situated approximately above the rear or downstream end of the plates 20. In this case, a not-shown rigid wall is situated adjacent to the plates, with the main function of this rigid wall being to prevent the harvest material from falling downward.

In the embodiments according to FIGS. 8 and 10–13, in lieu of the stationary pivot bearing 42, a vertically moving sliding bearing 44 is guided by a slideway 46 such that it moves transverse to the material flow.

The downstream end region of the guide wall 28 is provided with a bearing 48 that is rigidly held in not-shown side walls of the harvest recovery machine 10 in the embodiments according to FIGS. 1, 2, 10, 11, 18 and 19. In the other embodiments, the bearing 48 is mounted so as to be adjustable.

The utilization of the sliding bearing 44 and the movable bearing 48 makes it possible to adjust the guide wall within the region of the rotor 26.

Strippers 30 are provided for each row of tines 38 and serve for receiving harvest material supplied by the tines 38 from the rotor 26 and additionally transporting the harvest material into the compression chamber 22. This means that only one stripper 30 is provided in an embodiment that includes only one row of tines 38.

The tines 38 have the same shape and arrangement in all embodiments, however, this is not absolutely imperative. The shape is defined due to the fact that an edge 50 situated at the rotor 26 or its tube 36, respectively, extends on part of an arc of a circle while a stripping edge 52 situated remote from the rotor 26 follows an involute. The position of the involute is chosen such that it tangentially extends from the tube 36 on an upstream end and ends on a downstream end with a maximum of distance from the tube 36. This means that the distance of the stripping edge 52 from the tube 36 increases constantly and continuously in the direction of material flow. The two downstream ends of the edge 50 and the stripping edge 52 are connected to one another in the shape of an arc. The stripper(s) 30 is/are preferably mounted on a not-shown carrier in a removable fashion. This carrier is situated within the region of the transport channel that is situated between the pick-up 14 and the inlet 24 and does not convey any material, with said carrier being extended or moved through suitable openings in the not-shown side walls of the harvest recovery machine 10. According to FIGS. 1 and 2, limit stops 54 are provided which define the end positions of the strippers 30. These limit stops 54 are intended for the carrier of the strippers 30 and may also be realized adjustably. It would also be conceivable to assign sensors to the limit stops 54, with said sensors determining whether the carrier and consequently the strippers 30 are situated in their end position or not. The circular shape of the inner edge 50 is chosen in such a way that it fits on the outer circumference of the tube 36, i.e., the strippers 30 can be supported on the tube 36 or at least maintain such a small distance from this tube that no harvest material can be clamped between the strippers 30 and the tube 36.

The adjusting device 32 is actuated by an external force, e.g., hydraulically or electrically. In this case, the actuation can either be realized in the form of manual control or automatic control or regulation. This control or regulation is not illustrated in the figures. The adjusting device 32 acts directly upon the rotor 26, the guide wall 28 and the stripper 30 in FIGS. 1–3, 6, 7, 14–16, and 18. In FIGS. 4, 5, 8–13, 16, 17 and 19, cranks or pitmans 56 or cables 58 are provided between the adjusting device 32 and the rotor 26, guide wall 28 and/or the strippers 30. In all embodiments, one end of the adjusting device 32 is arranged on a frame, undercarriage, side wall or the like so as to always be outside the transport channel such that material flow is not impaired. Although all embodiments show a double-acting adjusting device 32, it may also be realized in the form of a singleacting adjusting device, in which case the stroke that requires less power can be realized with the aid of a spring or another energy storing device. In addition, an energy storing device in the form of a damping element that absorbs peak loads may be provided between the adjusting device 32 and the rotor 26, the guide wall 28 and/or the stripper 30, however, this is not shown in the figures.

The cranks or pitmans 56 produce a connection between the adjusting device 32 and the rotor 26, the guide wall 28 and/or the stripper 30 when a compressive movement needs to be transmitted, with one or more pitman(s) 56 or one or more cable(s) 58 being used for transmitting a tensional movement.

Figure 2:
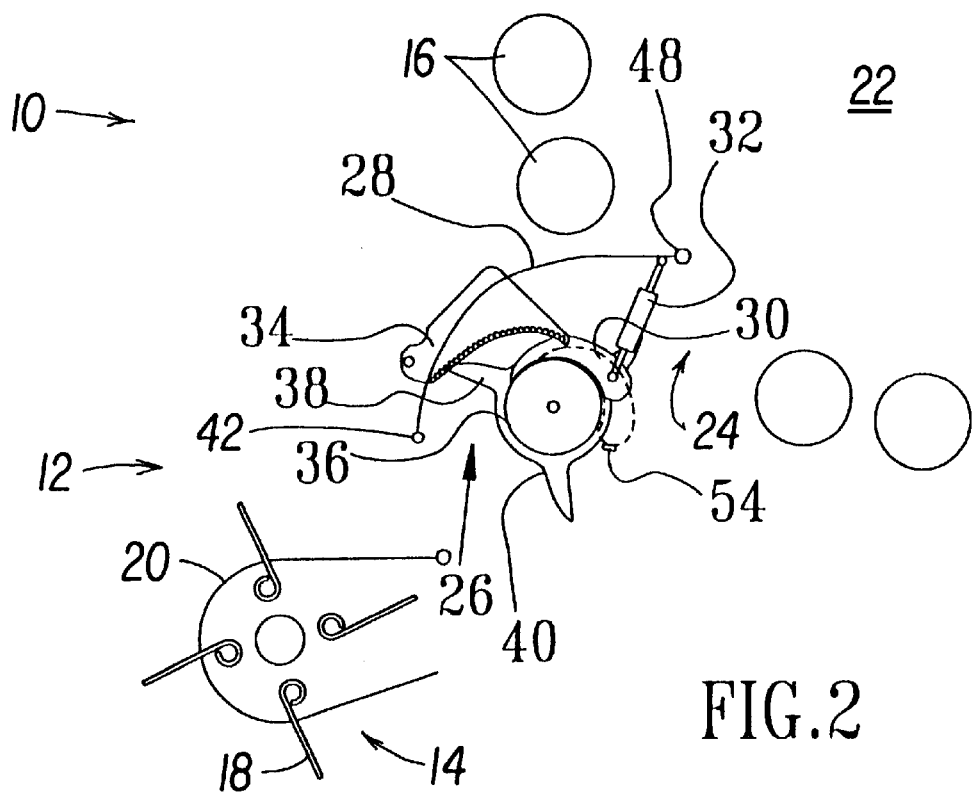
Figure 15:
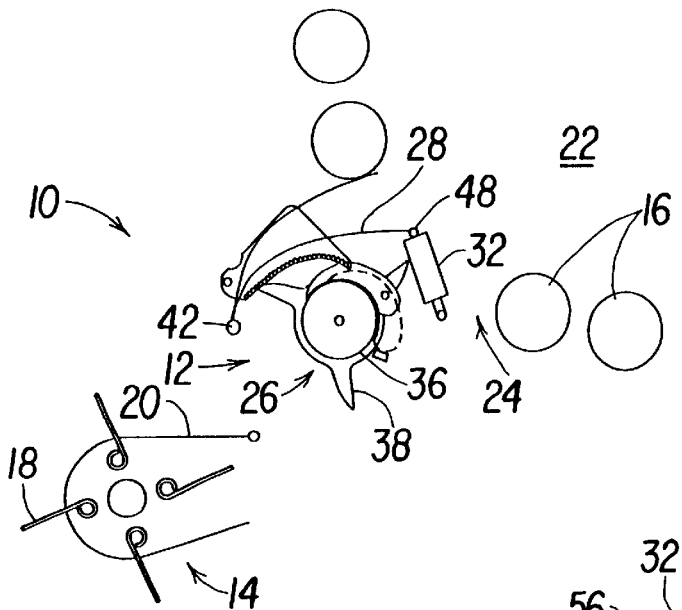

According to FIGS. 1 and 2, the adjusting device 32 directly engages on the strippers 30, with the adjusting device indirectly engaging on the guide wall 28 in FIGS. 6, 7 and 15, and in each case for over- or undershot transport. In the embodiment according to FIG. 3, one end of the adjusting device 32 engages on the stripper 30 and the other end engages on the guide wall 28 the correct position of the adjusting device 32 is achieved due to the fact that it is held and positioned between the strippers 30 or the guide wall 28 or the adjusting device 32 and the frame of the harvest recovery machine 10 by means of a not-shown spring or a similar adjusting element.

According to FIGS. 4 and 5, two pitmans 56 are provided. On of the ends of these pitmans collectively engages on the adjusting device 32, with their other ends being connected to the stripper 30 ad to the bearing 48 of the guide wall 28. Consequently, an adjustment of the adjusting device 32 causes the stripper 30 and the guide wall 28 to be moved out of, or into, the transport channel in the same sense such that the clear cross section is increased or reduced.

Figure 11:
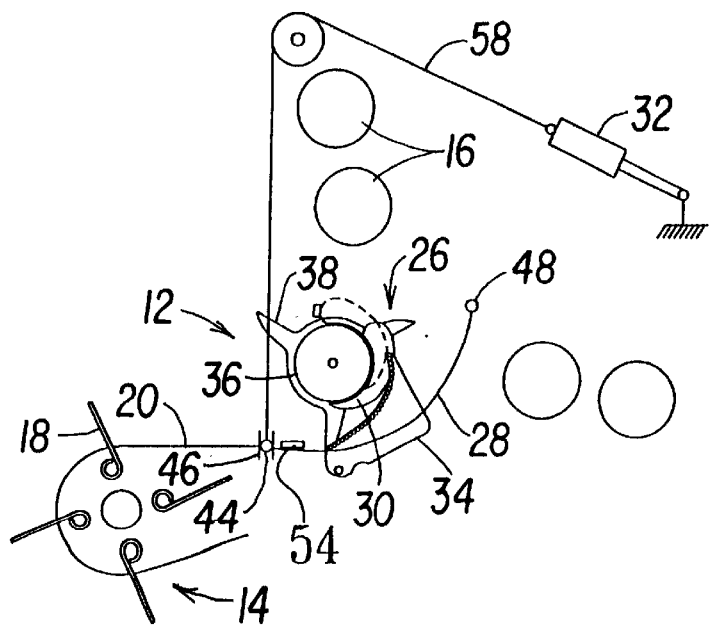

FIGS. 8 and 11 show an embodiment in which a cable 58 is provided between the sliding bearing 44 or the bearing 48 and the adjusting device 32. The cable path is turned back such that the position of the adjusting device 32 is changed.

Figure 9:
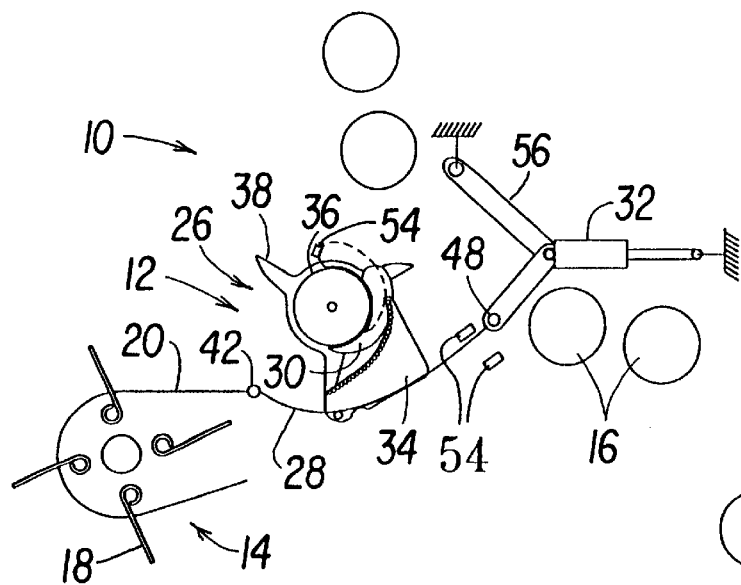
Figure 10:
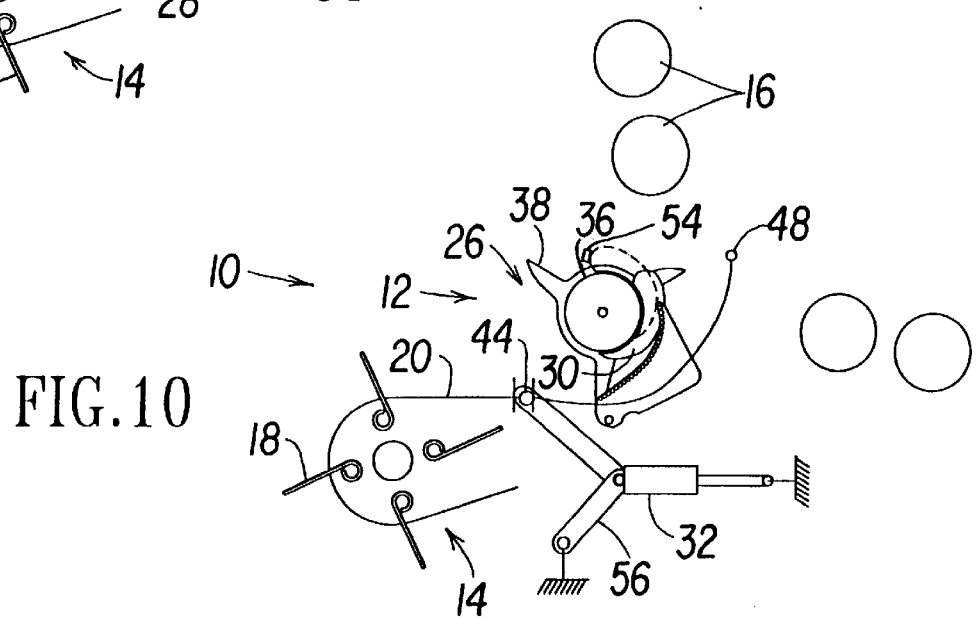

FIGS. 9 and 10 show a scissor-like pitmans system, in which one pitman 56 stabilizes the position of the adjusting device 32 and the other pitman 56 transmits movement on the sliding bearing 44 or bearing 48. Due to this measure, the movements can also be reversed and the adjusting device 32 can be arranged differently.

Figure 12:
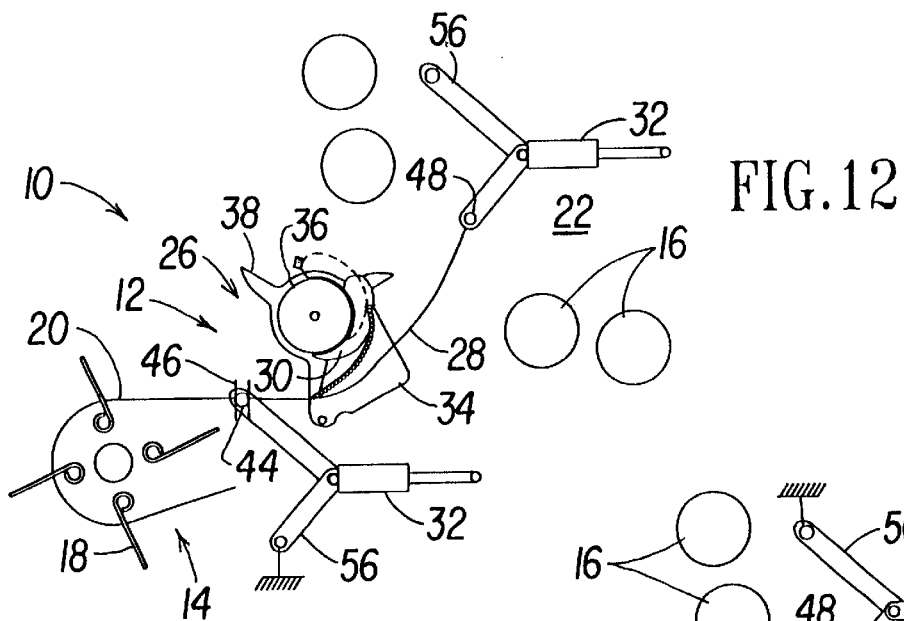
Figure 13:
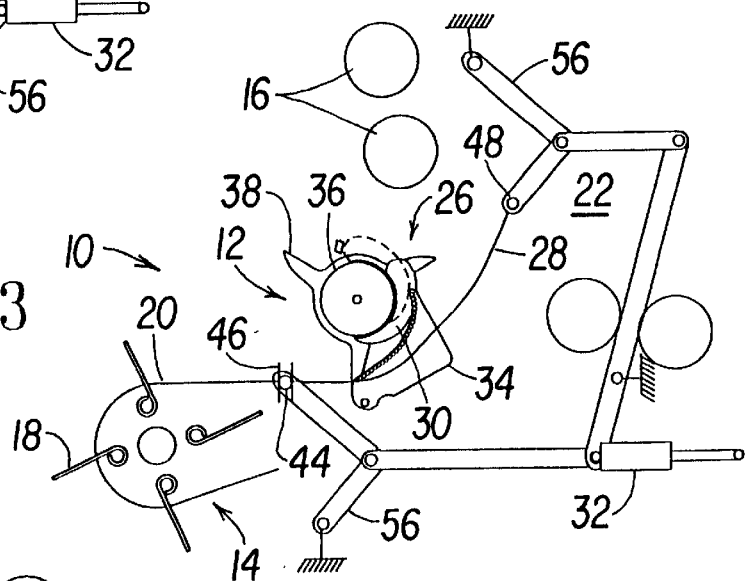

According to FIGS. 12 and 13, the position of the sliding bearing 44 and the position of the bearing 48 are changed by means of a scissor-like pitmans system. In FIG. 12, two adjusting devices 32 are provided, with only one adjusting device 32 being provided in FIG. 13. This adjusting device acts upon the two other pitman systems via a third scissor-like pitman system.

Figure 14:
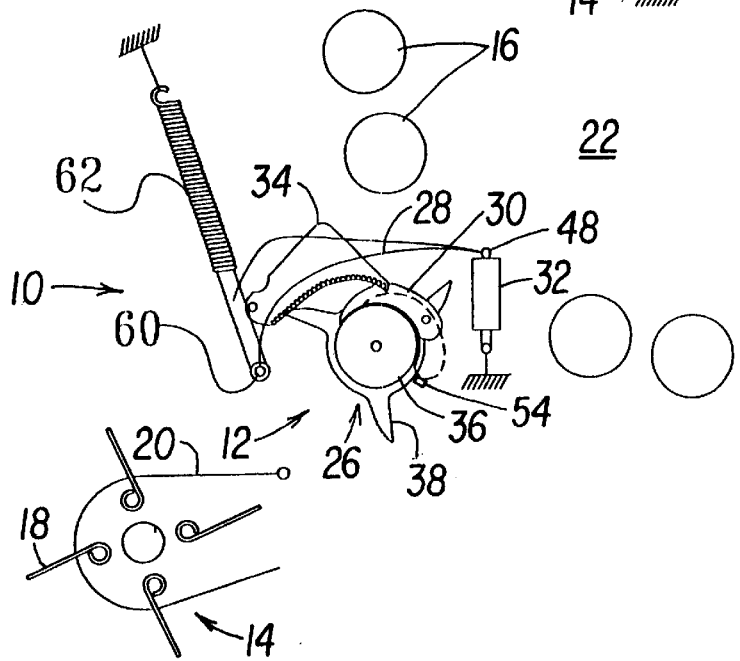
Figure 17:
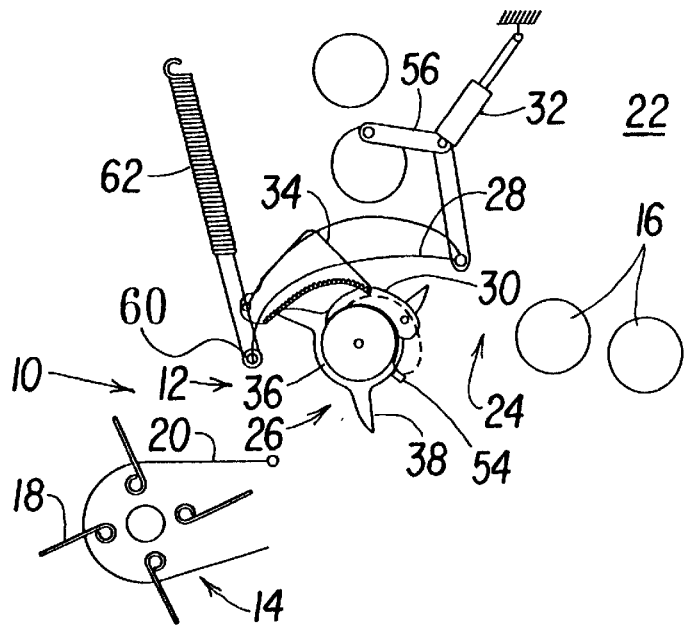

FIGS. 14 and 17 show an adjustment of a guide wall 28 during overshot transport. In these figures, the adjusting device 32 engages on the bearing 48, with the upstream end region of the guide wall 28 engaging on an energy storing device 62 by means of a bearing 60. This energy storing device 62 is mounted to the frame or the side walls of the harvest recovery machine 10 with one end realized in the form of a compression spring or other compressive energy storing device, such as a gas pressure accumulator, for example. This energy storing device 62 is arranged such that it is unable to bend and it is provided in order to eliminate the necessity for constant control or regulation of the adjustment device 32 and makes it possible to react to unforeseen peak loads, e.g., when a foreign body is present. In order to prevent destabilization of the position of the guide wall 28, corresponding guides and, if so required, limit stops 54 are provided. However, this is not shown in the figures.

Figure 16:
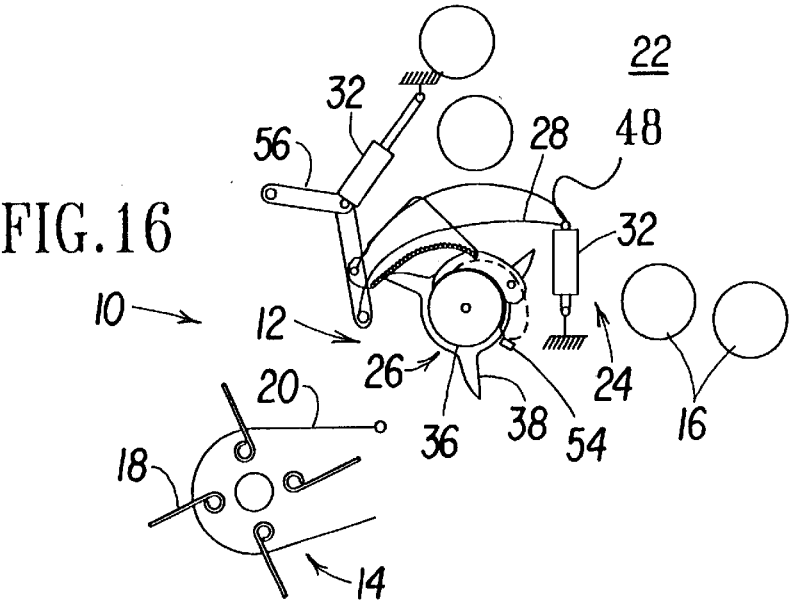

In the embodiment according to FIG. 16, a first adjusting device 32 is engaged on the front bearing 60 by means of a scissor-like pitman system and a second adjusting device is directly engaged on the rear bearing 48.

FIGS. 18 and 19 show an adjustment of the rotor 26 in order to change the clear cross section of the transport channel. For this purpose, the rotor 26 is, for example, accommodated in a vertically sliding fashion in a slideway 64 with the ends of its carrying shaft. The adjustment is again realized either directly with the aid of an adjusting device 32 (FIG. 18) or a scissor-like pitman system (FIG. 9). A not-shown synchronizing unit ensures the uniform movement of the rotor 26 at its end regions such that it cannot become jammed in the slideway 64. In a device that differs from this embodiment, the rotor 26 can also be adjusted when the strippers 30 and the guide wall 28 are arranged rigidly.

Although the engagement of the adjusting device 32, the pitman 56 and/or the cables 58 on the strippers 30 is respectively illustrated on the strippers 30, this merely serves for a simplified illustration of the function. This engagement is actually realized on the carrier of the strippers 30.

The knives 34 are arranged in accordance with the tines 38, i.e., directly laterally thereof, in order to produce a tensional cut in cooperation with the tines 38. The knives 34 have a conventional design and are conventionally mounted in an adjustable fashion on a carrier. The knives 34 extend through the above-mentioned slots in the guide wall 28 and protrude into the moving path of the drivers 38.

The sliding bearing 44 may be realized in the form of a rod, a pin or a roller and protrudes beyond the side walls of the harvest recovery machine 10 on the lateral ends of the guide wall 28. The slideway 46 can be easily realized in the form of two rails that are spaced apart from one another or a U-shaped profile, in which the respective sliding bearing 44 is able to move. According to FIG. 11, a limit stop 54 is provided above the guide wall 28. This limit stop prevents the guide wall 28 from protruding into the material flow and causing an obstruction.

Thus, it will be appreciated that the transport channel through which harvest material passes on its way the baler inlet 24 is defined in part by the rotor 26, the guide wall 28 and the stripper 30 and that by adjusting any one of these transverse to the path along which the harvest material flows, the cross section of the channel is either increased or decreased, with this adjustment being made so that a desired material density is always achieved. The degree of adaptation of the channel cross section to the material thickness can be predetermined by the driver or determined by a sensor. The sensor may measure various signals, e.g., the load on the rotor carrying the tines 18 of the pick-up 14, the density of the harvest material which is determined by means of ultrasound or the like, the height of the harvest material windrow or the like. Since the quantity of harvest material, i.e., its volume, represents a relatively reliable measure for the load to be expected, in particular, if its specific properties such as mass, firmness and the like are also taken into consideration, it is very well suited as a basis for determining a control value.

A value for the size of the clear cross section of the transport channel is generated by means of a manual or automatic control or regulation device. Such an automatic regulation or control is able to react to the conditions of the various harvest materials and harvesting conditions, e.g., humidity, soiling and the like, and can be realized by determining corresponding data during tests and storing said data in memory that is used for determining the transport channel cross section. This value leads to an adaptation of the clear cross section to the material quantity, namely in such a way that a certain density for ensuring reliable transport behavior is always achieved.

Depending on the respective embodiment, a movement of the adjusting device 32 results in a movement of the rotor 26, the guide wall 28 and/or the strippers 30. When the adjusting device 32 is extended, an enlargement of the clear cross section is achieved in most embodiments, except for those illustrated in FIGS. 10, 17 and 19. For example, the strippers 30 are pivoted about coaxially to the tube 36 in FIGS. 1 and 2 such that they increase the clear cross section. If the adjusting device 32 is, for example, extended in FIGS. 4–7, the guide wall 28 moves away from the rotor 26 and the clear cross section is increased. In the embodiments according to FIGS. 12 and 16, the control or regulation of the respective adjusting device 32 is decisive for changing the clear cross section on the inlet side end, the outlet side end or both ends. In all instances, it is ensured that the harvest material has a uniform density which, in turn, ensures an operation without essentially any peak loads during the transport, and in particular, the cutting process.

Having described the preferred embodiment, it will become apparent that various modifications can be made without departing from the scope of the invention as defined in the accompanying claims.

What is claimed is:

1. In an agricultural harvest recovery machine including a pick-up, a harvest material processing device including an inlet and a harvest material transport arrangement located for causing harvest material to flow along a path extending fore-and-aft from said pick-up to said inlet, with said transport arrangement including a rotor having a transverse rotational axis, a stripper associated with said rotor and a guide wall located in the vicinity of said rotor and cooperating therewith to define upper and lower boundaries of a transport channel, the improvement comprising: said stripper being mounted for movement about said rotor toward and away from said guide wall so as to respectively further restrict or open said transport channel; and an adjusting device being coupled to said stripper for selectively moving the same.

2. The harvest recovery machine defined in claim 1 wherein said adjusting device is power operated.

3. The harvest recovery machine defined in claim 2 wherein said adjusting device is a hydraulic cylinder.

4. The harvest recovery machine defined in claim 1 wherein said adjusting device is manually operated.

5. The harvest recovery machine defined in claim 1 wherein said stripper has a stripping edge, the distance of which, from said guide wall, changes over its length, and the position of which, relative to the rotational axis of the rotor, changes when said stripper is adjusted.

6. The harvest recovery machine defined in claim 5 wherein said stripping edge follows an involute with reference to a rotational axis of said rotor.

7. The harvest recovery machine defined in claim 6 wherein said rotor includes a core defined by a cylindrical tube; and said stripper being mounted for sliding on an outer surface location of said tube.

8. The harvest recovery machine defined in claim 1 wherein said guide wall is mounted for pivoting about a horizontal axis located at an end upstream of said rotor and has a downstream end that is mounted for movement about said axis in a direction transverse to said path.

9. The harvest recovery machine defined in claim 8 wherein said end upstream of said rotor is mounted for being adjusted transverse to a said path in a controlled fashion.

10. The harvest recovery machine defined in claim 9 wherein a sliding bearing is provided on said guide wall at said end upstream from said rotor; and a slideway extending transverse to said path and having said sliding bearing located therein for controlled movement.

11. The harvest recovery machine defined in claim 1 wherein said rotor operates as an overshot rotor; and said guide wall being located above said rotor so as to guide harvest material carried by it.

12. The harvest recovery machine defined in claim 1 wherein said rotor operates as an undershot rotor; and said guide wall being located below said rotor so as to guide harvest material carried by it.

13. The harvest recovery machine defined in claim 1 wherein said rotor is mounted for movement transverse to said path.

14. The harvest recovery machine defined in claim 1 wherein said guide wall is pivotally mounted at its upstream end for vertical movement transverse to said path; and adjusting device being coupled to a downstream end of said guide wall for causing simultaneous adjustment of said stripper and guide wall.

15. The harvest recovery machine defined in claim 1 wherein said guide wall has both its upstream and its downstream ends mounted for movement transverse to said path; and said adjusting device being coupled for causing adjustment of said ends.

16. The harvest recovery machine defined in claim 1 wherein said guide wall has both its upstream and downstream ends mounted for movement transverse to said path; and said adjusting device including an energy storing element coupled to one of said ends of said guide wall in a manner for resisting movement of said guide wall in a direction away from said rotor; and a further element of said adjusting device being coupled to another of said of said guide wall for effecting movement thereof transverse to said path.

17. In an agricultural harvest recovery machine including a pick-up, a harvest material processing device including an inlet and a harvest material transport arrangement located for causing harvest material to flow along a path extending fore-and-aft from said pick-up to said inlet, with said transport arrangement including a rotor, a stripper associated with said rotor and a guide wall located in the vicinity of said rotor and cooperating therewith to define upper and lower boundaries of a transport channel, the improvement comprising; said stripper and rotor are each mounted for movement toward and away from said guide wall so as to respectively further restrict or open said transport channel; and said adjusting K device being coupled to said stripper and said rotor for causing simultaneous adjustment of said stripper and rotor.

18. In an agricultural harvest recovery machine including a pick-up, a harvest material processing device including an inlet and a harvest material transport arrangement located for causing harvest material to flow along a path extending fore-and-aft from said pick-up to said inlet, with said transport arrangement including a rotor, a stripper associated with said rotor and a guide wall located in the vicinity of said rotor and cooperating therewith to define upper and lower boundaries of a transport channel, the improvement comprising: said stripper, guide wall and rotor are each mounted for movement transverse to said path so as to respectively further restrict or open said transport channel; and said adjusting device being coupled to said stripper, guide wall and rotor for selectively adjusting said stripper, guide wall and rotor.

* * * * *